United States Patent Office 3,091,395
Patented May 28, 1963

3,091,395
THERMOSTATIC GAS VALVE
Bradley C. Douglas, Kirkwood, Mo., assignor to Micro Controls, Inc., St. Louis, Mo., a corporation of Ohio
Filed Jan. 4, 1962, Ser. No. 164,237
13 Claims. (Cl. 236—99)

This invention relates to gas valves used in apparatus for oven cooking ranges and the like, and more particularly to a thermostatic gas valve for adjustably controlling the intensity of a pilot burner flame which in turn controls the operation of means for supplying gas to a main burner.

Among the several objects of the invention may be noted the provision of a thermostatic gas valve through which only pilot gas passes; the provision of a gas valve of the type described which is simple and convenient to adjust and recalibrate; and the provision of a thermostatic gas valve adapted to accomplish regulation over a large temperature range by means of a comparatively low-cost and simple arrangement of parts. Other objects and features will be in part apparent and in part pointed out hereinafter.

The invention accordingly comprises the constructions hereinafter described, the scope of the invention being indicated in the following claims.

Figure 1:
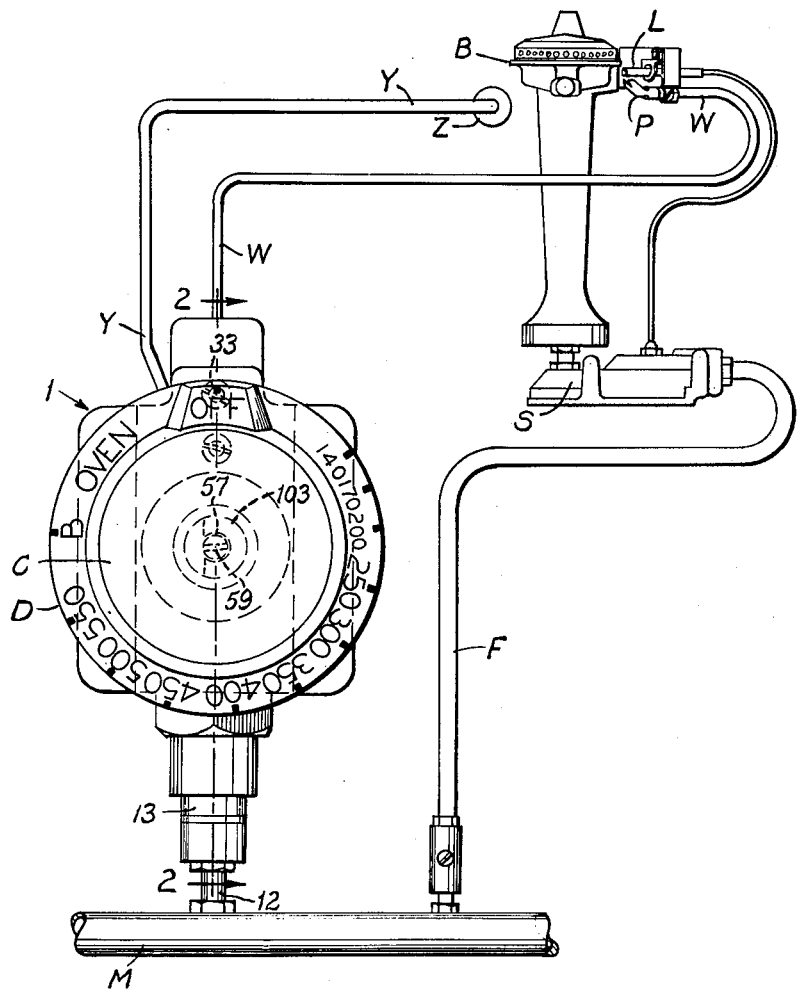
Figure 2:
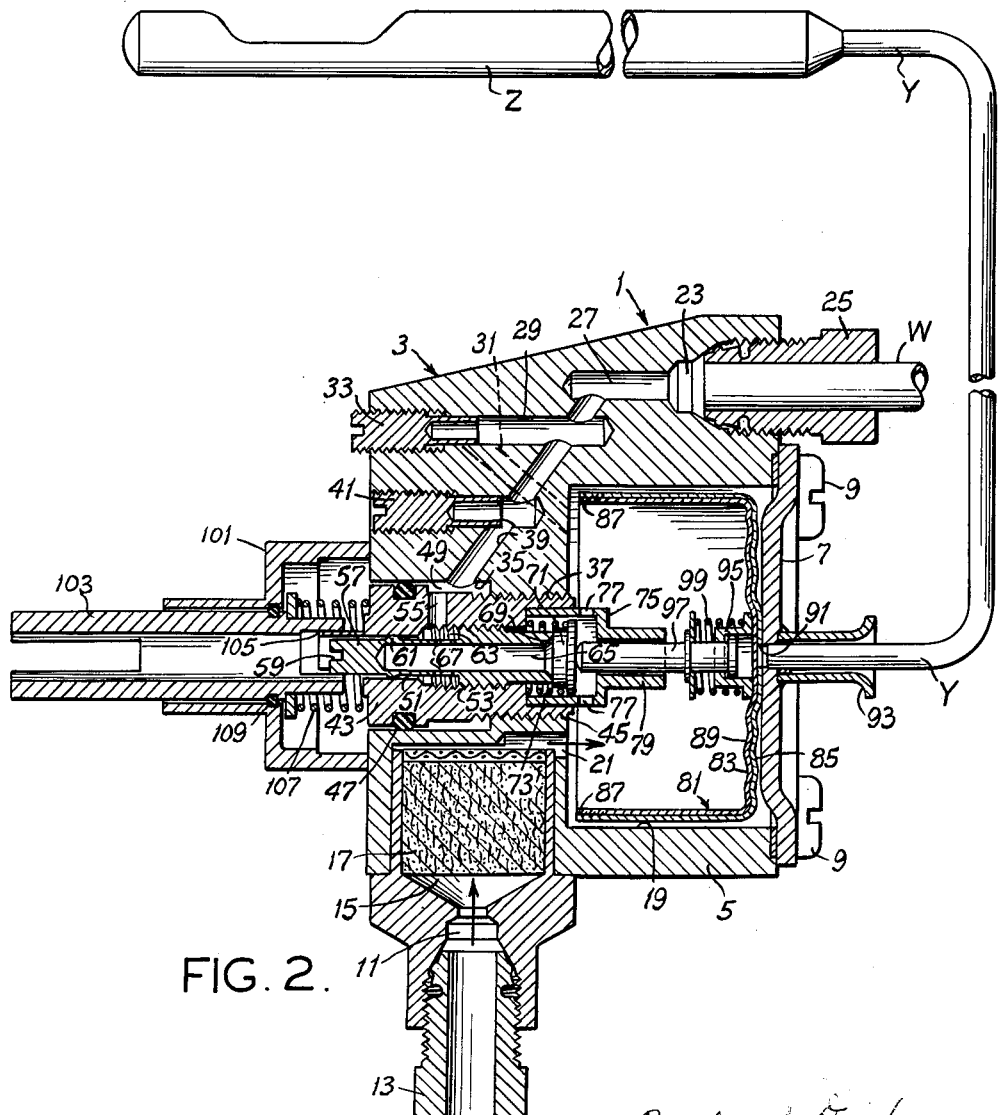

In the accompanying drawings, in which one of various possible embodiments of the invention is illustrated, FIG. 1 is a diagrammatic view showing how a gas valve of this invention is incorporated in a regulator system for a gas burner; and FIG. 2 is an axial section of the gas valve taken on line 2—2 of FIG. 1, parts being omitted for clarity.

Corresponding reference characters indicate corresponding parts throughout the several views of the drawings.

Although the invention described herein has general use, a particular use is for thermostatic gas valve systems for oven temperature control, in relation to which the invention will be described as an example.

Referring now more particularly to the drawings, FIG. 1 illustrates a thermostatic gas valve 1 of this invention as utilized in gas burner apparatus. In this figure, P is a constantly burning pilot adapted to receive a small amount of gas from a main gas line M, through valve 1 and a line W. Pilot P serves to ignite the burner B when gas is supplied to the latter. Device L is a known type of temperature-responsive thermostatic element and is located in heat-exchange relationship with pilot P. Device L controls a known type of main burner valve S, i.e., upon being heated to a predetermined temperature thermostatic element L will cause valve S to open and permit gas to flow from main supply line M through a line F into burner B. However, the small amount of gas constantly being supplied to pilot P over line W is not sufficient to create a flame of enough intensity to raise the temperature of thermostatic element L to the predetermined temperature. It is only when an extra amount of gas is permitted to pass through valve 1 and line W to pilot P that the flame issuing therefrom reaches such an intensity that device L will cause valve S to open. As more fully explained hereinafter, valve 1 is operative by means of a dial D and a liquid-filled temperature-responsive bulb Z to control the amount of the extra gas supplied to pilot P. Dial D is shown in FIG. 1 but omitted from FIG. 2. Bulb Z is located in the space to be heated, as, for example, the oven of a cooking range which is heated by burner B.

Referring now to FIG. 2, valve 1 comprises a body 3 formed of parts 5 and 7 which are held together by screws 9. At numeral 11 is shown a gas inlet into which an inlet fitting 13 is threaded. Inlet fitting 13 connects inlet 11 with the main gas line M through a pipe 12. Inlet 11 communicates with a compartment 15 in which is located a filter unit 17. Parts 5 and 7 form a gas chamber 19 which is connected to compartment 15 by an inlet port 21. An outlet port 23 is connected by a fitting 25 to line W. Outlet 23 is connected to gas chamber 19 by passages 27, 29 and 31, the latter passage being shown by dotted lines in FIG. 2. The size of the opening between passage 31 and passage 29 is under control of an adjustable threaded control valve 33 threaded into passage 29.

Body 3 is also provided with a passage 35 extending through the body to the gas chamber 19. The inner end of this passage 35 is threaded as indicated at 37. Passage 35 is in communication with port 29 by means of a port 39. An adjustable threaded control valve 41 is adapted to control the maximum amount of gas that may pass through port 39. Threaded within passage 35 is a tubular member 43 threaded on its inner end 45. A resilient sealing ring 47 seals member 43 within passage 35. Part 5 and member 43 are so constructed that an annular passage 49 is provided around the member 43 between the inner and outer ends thereof.

Member 43 is also provided with a passage 51. Passage 51 is threaded as indicated at 53. A port 55 connects passage 51 to annular passage 49.

Threaded into passage 51 is a stem 57 which has a slot 59 on its outer end. An annular raised portion 61 toward the outer end of stem 57 seals the stem within passage 51. Member 43 and stem 57 cooperate to form an annular passage 63 surrounding the stem 57 between its inner and outer ends.

Stem 57 is provided with an elongate cavity 65 opening at the inner end thereof into gas chamber 19. Openings 67 connect cavity 65 with annular passage 63. The inner end of stem 57 is provided with a valve seat 69.

A valve member 71 is adapted to seat on seat 69 and is biased therefrom by a spring 73. Surrounding valve member 71 and spring 73 is a cage member 75 having passages 77 therein communicating with chamber 19. Movement of valve member 71 is confined and aligned by cage member 75. Cage member 75 also includes a sleeve 79 extending inwardly into chamber 19.

A double-walled cup 81 is located in chamber 19. Cup 81 has an inside wall 83 and an outside wall 85, the latter being soldered or otherwise attached to the inside of part 7. The marginal portions 87 of the cup members 83 and 85 are sealed together as by welding or soldering, the remaining portions of the members 83 and 85 being unjoined. Both walls are corrugated in their portions forming the inside bottom 89 of cup 81. The outside member 85 is provided with an opening 91 communicating with a line Y. Line Y is sealed to the part 7 and a sleeve 93 surrounds the end of line Y. The other end of line Y is connected to bulb Z which, as previously stated, is located in the space to be heated by the burner B. The bulb Z, line Y and available space between the bimetallic members 83 and 85 are filled with a thermally responsive liquid which is adapted upon expansion in response to heating to enter between the members 83 and 85, so as to force them apart. This drives the bottom member 83 to the left away from bottom 85. The inner bottom 83 carries an attached guide member 95 which has a sliding engagement with a flanged pin 97. Pin 97 passes through sleeve 79 and is biased away from the bottom 89 of cup 81 by a spring 99. In response to increased oven temperatures applied to bulb Z, the fluid presses to the left the following parts: inside cup bottom 83, parts 95, 99, 97 and valve member 71. This tends to seat valve 71 on seat 69. Under conditions in which the valve 71 may have closed and further expansion of the fluid occurs, member 95 will slide on pin 97. Thus an overriding action occurs which prevents damage to any parts. Upon cooling, the reverse action occurs as the valve 71 moves toward its open position.

The fit between the threads of stem 57 and tubular member 43 is sufficiently tight that these members will rotate together when the dial D is rotated, whether or not the valve 71 is seated on the seat 69. However, the fit is not tight enough to prevent relative rotary adjustment between the members 43 and 57 under forceful manual twisting action from a screwdriver while the parts 43 and 103 (connected at 105) are held by the usual dial attached to 103. It will be observed that, when the valve 71 is on the seat 69 under pressure from the pin 97, the action of the pin at the center of the valve exerts little or no resisting-torque to rotation of the assembly 43, 57, 71, 79 and 73.

Mounted on the rear side of member 5, i.e., the left side as viewed in FIG. 2, is a cap member 101. A tubular operating member 103 passes through cap 101 and is splined as indicated at 105 to member 43. Member 103 is biased to the left by a spring 107. A snap ring 109 holds member 103 against axial movement. Dial D (see FIG. 1) is positioned on the outer end of member 103. This dial is of the type which has temperature markings for an oven temperature ranging, for example, from 140° F. to over 550° F. A removable cap C is mounted on the face of dial D within the temperature markings.

Operation is as follows:

Consider first the preparations required at the time of initial installation. Gas will initially flow through inlet 11, gas chamber 19, ports 31, 29 and 27, outlet 23 and line W to pilot P. The pilot gas is then ignited and thereafter burns constantly unless accidentally extinguished. The flame produced by this gas is of a relatively low intensity and is not sufficient to heat thermostatic element L to its predetermined actuating temperature.

Next operation in use will be considered. Dial D is turned counterclockwise to call for heat in, for example, a comparatively high-temperature range, such as 400° F. This is done by turning dial D approximately one-half turn counterclockwise from its FIG. 1 position. This results in threaded member 43 being moved backwardly, i.e., to the left as viewed in FIG. 2, a predetermined distance. Since stem 57 is supported within member 43 it will also be moved back this predetermined distance away from valve member 71. Gas will then flow from chamber 19 through passages 77 in cage member 75, through cavity 65, openings 67, annular passage 63, port 55, annular passage 49, passages 39 and 27, outlet 23 and line W to pilot P. The gas issuing from pilot P at this point is a combination of the gas supplied through the last-mentioned path and the constantly supplied gas which passes from inlet 11 into chamber 19, through ports 31, 29 and 27, outlet 23 and line W to the pilot. This causes the flame issuing from pilot P to be increased, which in turn is sufficient to cause thermostatic element L to become heated to the predetermined temperature at which it will open main burner valve S. Gas is thereby permitted to flow from main gas line M, through line F, past valve S to main burner B, where it will be ignited by the flame issuing from pilot P. It may be remarked at this point that if the flame issuing from pilot P should accidentally become extinguished, valve S would reclose, which constitutes a safety feature, since this would cut off a large outpouring of gas from the burner B. The small amount of leakage from the pilot P would not be dangerous.

As the temperature in the oven gradually increases to 400° F., the liquid within bulb Z, through its expansion causes the inside cup member 83, parts 95, 97 and 99 to be moved to the left, thereby pushing valve member 71 toward seat 69. When the valve member 71 becomes seated on seat 69, the gas flow through cavity 65, opening 67, ports 55 and 39 is stopped. As a result, the flame issuing from pilot P diminishes and thermostatic element L begins to cool. Upon cooling a predetermined amount, element L will cause valve S to close, thereby cutting off the supply of gas to main burner B. As the temperature in the oven then decreases, the pin 97 will be moved to the right along with the bottom member 83 of cup 81. This permits spring 73 to force valve member 71 off of seat 69 and gas will again flow into cavity 65 to the pilot P. Pilot P then increases in intensity and thermostatic element L, upon being heated to the predetermined temperature, will open main valve S. Thus the apparatus will continue to cycle in this fashion as long as the dial is set at the 400° F. reading.

It is to be noted that the gas valve 1 is provided with means by which the valve may be conveniently and simply recalibrated should it become out of adjustment. For example, if after a period of use, the oven temperature is found to be 450° F. when the dial is set at 350° F., the dial cap C is removed and a screwdriver or other implement is inserted through tubular member 103 into the slot 59 of stem 57. Stem 57 is then held in a fixed position while the dial D is moved counterclockwise approximately one-eighth of a turn to bring the 450° F. mark to a straight-up position. This causes tubular member 43 to be moved axially and rotatably relative to stem 57. The dial reading of 450° F. will now compare with the oven temperature of 450° F. and the gas valve is accurately recalibrated.

Considering another example, let it be assumed that the oven temperature is 300° F. when the dial is set at 400° F. The cap C is then removed and a screwdriver or other implement is engaged in slot 59 of stem 57. The stem is then held in a fixed position while the dial is rotated clockwise approximately one-eighth of a turn from a 400° F. setting to a 300° F. setting. At this point the dial then indicates the correct oven temperature and the valve is recalibrated.

During the initial assembly of the thermostatic gas valve 1 the valve may be calibrated in substantially the same manner as above, thereby providing an effective and simple calibrating operation.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A thermostatic gas valve comprising a body having a gas chamber, an inlet into said gas chamber, an outlet, a threaded passage in said body communicating with said gas chamber, a rotatable tubular member threaded into the threaded passage in said body, a threaded passage in said tubular member, a stem threaded into the passage in said tubular member, said stem having a cavity opening into said gas chamber, a seat on the inner end of said stem, port means connecting said cavity with said outlet, and a thermostatically controlled valve member movable to and from said stem and having means adapted to be engaged with said seat.

2. A thermostatic gas valve as set forth in claim 1 further comprising rotatable means connected to said tubular member adapted upon rotation to rotate said tubular member, said rotatable means having an opening therein providing access to the outer end of said stem whereby the stem may be manually rotated relative to said tubular member.

3. A thermostatic gas valve as set forth in claim 1 further comprising a cage member surrounding said valve member for confining and aligning the movement thereof, said cage member having passage means therethrough for permitting the flow of gas from said gas chamber to said valve member.

4. A thermostatic gas valve as set forth in claim 1 further comprising passage means connecting said chamber directly to said outlet.

5. A thermostatic gas valve comprising a body having a gas chamber, an inlet into said gas chamber adapted to be connected to a gas supply, an outlet adapted to be connected to a pilot burner, a passage in said body communicating with said gas chamber, an inner portion of said passage being threaded, a rotatable tubular member threaded into the threaded portion of the passage in said body, a threaded passage in said tubular member, a stem threaded into the passage in said tubular member, said stem having a cavity opening into said gas chamber, a seat on the inner end of said stem, port means connecting the cavity to the passage in said tubular member, the passage in said tubular member to the passage in said body, and the passage in said body to the outlet, and a thermostatically controlled valve member movable to and from said stem and having means adapted to be engaged with said seat.

6. A thermostatic gas valve as set forth in claim 5, further comprising rotatable means connected to said tubular member adapted upon rotation to rotate said tubular member, said rotatable means having an opening therein providing access to the outer end of said stem whereby the stem may be manually rotated relative to said tubular member.

7. A thermostatic gas valve as set forth in claim 6 comprising a cage member surrounding said valve member for confining and aligning the movement thereof, said cage member having passage means therethrough for permitting the flow of gas from said gas chamber to said valve member.

8. A thermostatic gas valve as set forth in claim 7 further comprising passage means connecting said chamber directly to said outlet.

9. A thermostatic valve comprising a body having a gas chamber, an inlet into said gas chamber, an outlet, a passage in said body communicating with said gas chamber, an inner portion of said passage being threaded, a rotatable tubular member threaded into the threaded portion of the passage in said body and having a sealed fit with the passage in said body at the outer end of said passage, said body and tubular member forming an annular passage around said tubular member between the inner and outer ends thereof, a threaded passage in said tubular member, a stem threaded into the passage in said tubular member and having a sealed fit with the passage in said tubular member toward the outer end thereof, said tubular member and stem forming an annular passage around said stem between the inner and outer ends thereof, said stem having an internal cavity opening into said gas chamber, a seat on the inner end of said stem, port means connecting the cavity to said annular passage surrounding the stem, the annular passage surrounding the stem to the annular passage surrounding the tubular member, and the annular passage surrounding the tubular member to the outlet, and a thermostatically controlled valve member movable to and from said stem and having means adapted to be engaged with said seat.

10. A thermostatic gas valve as set forth in claim 9 further comprising rotatable means connected to said tubular member adapted upon rotation to rotate said tubular member, said rotatable means having an opening therein providing access to the outer end of said stem whereby the stem may be manually rotated relative to said tubular member.

11. A thermostatic gas valve as set forth in claim 10 further comprising a cage member surrounding said valve member for confining and aligning the movement thereof, said cage member having passage means therethrough for permitting the flow of gas from said gas chamber to said valve member.

12. A thermostaic gas valve as set forth in claim 11 further comprising passage means connecting said chamber directly to said outlet.

13. Apparatus for regulating the flame of a constantly burning pilot means comprising a thermostatic gas valve, said valve having a body including a gas chamber, an inlet connecting said gas chamber to a gas supply, an outlet, means connecting said outlet to said pilot means, a passage in said body communicating with said gas chamber, an inner portion of said passage being threaded, a rotatable tubular member threaded into the threaded portion of the passage in said body, a threaded passage in said tubular member, a stem threaded into the passage in said tubular member, said stem having an internal cavity opening into said gas chamber, a seat on the inner end of said stem, port means connecting said cavity with said outlet, a valve member having means adapted to be engaged with said seat, and thermostatic means adapted to move said valve member toward and away from said stem for closing and opening said cavity.

References Cited in the file of this patent
UNITED STATES PATENTS

| | | |
|---|---|---|
| 1,704,807 | O'Neal | Mar. 12, 1929 |
| 2,066,821 | Brumbaugh | Jan. 5, 1937 |
| 2,807,423 | Eskin | Sept. 24, 1957 |
| 2,991,013 | Wantz | July 4, 1961 |